(12) United States Patent
Someya

(10) Patent No.: US 7,245,097 B2
(45) Date of Patent: Jul. 17, 2007

(54) MOTOR CONTROL SYSTEM AND VACUUM PUMP EQUIPPED WITH THE MOTOR CONTROL SYSTEM

(75) Inventor: Osamu Someya, Narashino (JP)

(73) Assignee: BOC Edwards Japan Limited (JP)

( * ) Notice: Subject to any disclaimer, the term of this patent is extended or adjusted under 35 U.S.C. 154(b) by 196 days.

(21) Appl. No.: 10/935,964

(22) Filed: Sep. 8, 2004

(65) Prior Publication Data
US 2005/0052146 A1 Mar. 10, 2005

(30) Foreign Application Priority Data
Sep. 10, 2003 (JP) .............................. 2003-318761

(51) Int. Cl.
*H02P 7/00* (2006.01)
(52) U.S. Cl. ...................... 318/434; 318/432; 318/254; 318/138; 318/439
(58) Field of Classification Search ................ 318/727, 318/432–434, 471, 254, 138
See application file for complete search history.

(56) References Cited
U.S. PATENT DOCUMENTS
6,141,494 A * 10/2000 Nishino et al. ............. 388/811

| | | | |
|---|---|---|---|
| 6,326,753 B1 * | 12/2001 | Someya et al. | 318/471 |
| 6,334,503 B1 * | 1/2002 | Fukumura et al. | 180/446 |
| 6,339,307 B1 * | 1/2002 | Andersson et al. | 318/701 |
| 6,354,805 B1 * | 3/2002 | M.o slashed.ller | 417/44.11 |
| 2003/0122517 A1 * | 7/2003 | Lange et al. | 318/471 |

FOREIGN PATENT DOCUMENTS
EP 0883042 12/1998

OTHER PUBLICATIONS
Husain, Ehsani: "Torque ripple minimization in switched reluctance motor drives by PWM current control" IEEE Transactions on Power Electronics, [Online] vol. 11, No. 1, 1996, pp. 83-88, XP002348150 Retrieved from the Internet: URL:http://ieeexplore.ieee.org/iel3/63/10248/00484420.pdf> [retrieved on Oct. 7, 2005] *abstract* pp. 86, 87, paragraph V * *figure 4*.

* cited by examiner

*Primary Examiner*—Rina Duda
(74) *Attorney, Agent, or Firm*—Adams & Wilks

(57) ABSTRACT

A motor control system has a rotary member, a motor for imparting a torque to the rotary member, a motor driving circuit for supplying power to the motor, and a drive control circuit for controlling a motor current supplied to the motor. An upper limit value of the motor current supplied to the motor is set so as to be variable. At the start of the motor, the drive control means controls the motor current by using the upper limit value as a set value.

6 Claims, 11 Drawing Sheets

RELATIONSHIP BETWEEN TURBO MOLECULAR PUMP
STARTING TIME AND ROTOR SHAFT RPM

RELATIONSHIP BETWEEN ROTOR SHAFT RPM AND MOTOR CURRENT

MOTOR CONTROL SYSTEM AND VACUUM PUMP EQUIPPED WITH THE MOTOR CONTROL SYSTEM

BACKGROUND OF THE INVENTION

1. Field of the Invention

The present invention relates to a motor control system and a vacuum pump equipped with the motor control system, and more particularly to a motor control system capable of shortening the starting time of a turbo molecular pump and a vacuum pump equipped with the motor control system.

2. Description of the Related Art

As a result of recent developments in electronics, there is a rapidly increasing demand for semiconductor devices, such as memories and integrated circuits.

Such semiconductor devices are manufactured by doping semiconductor substrates of a very high purity with impurities to impart electrical properties thereto, by stacking together semiconductor substrates with minute circuit patterns formed thereon, etc.

In order to avoid the influences of dust in the air, etc., such operations must be conducted in a chamber in a high vacuum state. To evacuate the chamber, a vacuum pump is generally used; in particular, a turbo molecular pump, which is a kind of vacuum pump, is widely used since it involves little residual gas, allows maintenance with ease, etc. Further, a semiconductor manufacturing process involves a number of steps in which various process gasses are caused to act on a semiconductor substrate, and, the turbo molecular pump is used not only to create a vacuum state in the chamber but also to evacuate such process gases from the chamber.

Further, in electron microscope equipment, a turbo molecular pump is used to create a high vacuum state in the chamber of the electron microscope in order to prevent refraction of the electron beam, etc. due to the presence of dust or the like.

Further, a turbo molecular pump is used in a movable simple vacuum chamber, or in order to place a flat panel display manufacturing apparatus in a vacuum state.

Such a turbo molecular pump is composed of a turbo molecular pump main body 100 for sucking and evacuating gas from the chamber of a semiconductor manufacturing apparatus or the like, and a control device 200 for controlling the turbo molecular pump main body.

FIG. 7 shows the construction of a turbo molecular pump.

In FIG. 7, the turbo molecular pump main body 100 has an inlet port 101 formed at the upper end of a round outer cylinder 127. On the inner side of the outer cylinder 127, there is provided a rotary member 103 in the periphery of which there are formed radially and in a number of stages a plurality of rotary vanes 102a, 102b, 102c, . . . consisting of turbine blades for sucking and evacuating gases.

Mounted at the center of this rotary member 103 is a rotor shaft 113, which is floatingly supported and position-controlled by, for example, a 5-axis control magnetic bearing.

An upper radial electromagnet 104 consists of four electromagnets arranged in pairs in the X- and Y-axes. In close proximity to and in correspondence with the upper radial electromagnet 104, there is provided an upper radial sensor 107 consisting of four electromagnets. The upper radial sensor 107 detects a radial displacement of the rotor shaft 113, and transmits a displacement signal to the control device 200.

In the control device 200, the upper radial electromagnet 104 is excitation-controlled through a compensation circuit with a PID adjustment function (not shown in the drawings) based on the displacement signal obtained through detection by the upper radial sensor 107, thus adjusting the upper radial position of the rotor shaft 113.

The rotor shaft 113 is formed of a high magnetic-permeability material (such as iron), and is attracted by the magnetic force of the upper radial electromagnet 104. This adjustment is conducted independently in the X-axis direction and the Y-axis direction.

Further, a lower radial electromagnet 105 and a lower radial sensor 108 are arranged in the same way as the upper radial electromagnet 104 and the upper radial sensor 107, adjusting the lower radial position of the rotor shaft 113 in the same manner as the upper radial position thereof.

Further, axial electromagnets 106A and 106B are arranged so as to sandwich from above and below a circular metal disc 111 provided in the lower portion of the rotor shaft 113. The metal disc 111 is formed of a high magnetic-permeability material, such as iron.

Further, below the rotor shaft 113, there is provided an axial sensor 109 for detecting an axial displacement signal of the rotor shaft 113. An axial displacement obtained through detection by the axial sensor 109 is transmitted to the control device 200.

Based on the displacement signal obtained through detection by the axial sensor 109, the control device 200 excitation-controls the axial electromagnets 106A and 106B. At this time, the axial electromagnet 106A attracts the metal disc 111 upwardly by magnetic force, and the axial electromagnet 106B attracts the metal disc 111 downwardly.

In this way, the magnetic bearing appropriately adjusts the magnetic force applied to the rotor shaft 113, thereby magnetically levitating the rotor shaft 113 and retaining it in a non-contact fashion.

Further, there is provided a motor 121, which is a so-called brush-less motor. The motor 121 is equipped with an RPM detecting sensor, a motor current detecting sensor, a motor temperature detecting sensor, etc. described below, and, on the basis of detection signals from these sensors, the RPM, etc. of the rotor shaft 113 are controlled by the control device 200. The construction of the control system for the motor 121 will be described in detail below.

Formed on the rotor shaft 113 are the rotary vanes 102a, 102b, 102c, . . . . There are arranged a plurality of stationary vanes 123a, 123b, 123c, . . . , with a slight gap being between them and the rotary vanes 102a, 102b, 102c, . . . . Further, in order to downwardly transfer through collision the molecules of the exhaust gas, the rotary vanes 102a, 102b, 102c, . . . are respectively inclined by a predetermined angle with respect to planes perpendicular to the axis of the rotor shaft 113. Similarly, the stationary vanes 123 are respectively inclined by a predetermined angle with respect to planes perpendicular to the axis of the rotor shaft 113, and are arranged so as to protrude toward the interior of the outer cylinder 127 and in alternate stages with the rotary vanes 102.

Further, one ends of the stationary vanes 123 are supported while being inserted into recesses between a plurality of stationary vane spacers 125a, 125b, 125c, . . . stacked together. The stationary vane spacers 125 are ring-like members formed of a metal, such as aluminum, iron, stainless steel, or copper, or an alloy containing such metals as components.

Further, in the outer periphery of the stationary vane spacers 125, the outer cylinder 127 is secured in position with a slight gap therebetween. At the bottom of the outer cylinder 127, there is arranged a base portion 129, and, between the stationary vane spacers 125 and the base portion 129, there is arranged a threaded spacer 131. In the portion of the base 129 which is below the threaded spacer 131, there is formed an exhaust port 133, which communicates with the exterior.

The threaded spacer 131 is a cylindrical member formed of a metal, such as aluminum, copper, stainless steel, or iron, or an alloy containing such metals as components, and has on the inner peripheral surface thereof a plurality of spiral thread grooves 131a. The direction of the spiral thread grooves 131a is determined such that, when the molecules of the exhaust gas move in the rotating direction of the rotary member 103, these molecules are transferred toward the exhaust port 133.

Further, in the lowermost portion of the rotary member 103 connected to the rotary vanes 102a, 102b, 102c, . . . , there is provided a rotary vane 102d, which extends vertically downwards. The outer peripheral surface of the rotary vane 102d, is cylindrical, and protrudes toward the inner peripheral surface of the threaded spacer 131 so as to be in close proximity to the threaded spacer 131 with a predetermined gap therebetween.

Further, the base portion 129 is a disc-like member constituting the base portion of the turbo molecular pump main body 100, and is generally formed of a metal, such as iron, aluminum, or stainless steel. The base portion 129 physically retains the turbo molecular pump main body 100, and also functions as a heat conduction path, so that it is desirable to use a metal that is rigid and of high heat conductivity, such as iron, aluminum, or copper, for the turbo molecular pump main body 100.

When, in this construction, the rotor shaft 113 is driven by the motor 121 and rotates together with the rotary vanes 102, an exhaust gas from a chamber is sucked in through the inlet port 101 by the action of the rotary vanes 102 and the stationary vanes 123.

Then, the exhaust gas sucked in through the inlet port 101 flows between the rotary vanes 102 and the stationary vanes 123, and is transferred to the base portion 129. At this time, the temperature of the rotary vanes 102 rises due to the friction heat generated when the exhaust gas comes into contact with the rotary vanes 102, conduction of the heat generated in the motor 121, etc, and this heat is transmitted to the stationary vanes 123 side by radiation or conduction due to the gas molecules, etc. of the exhaust gas. Further, the stationary vane spacers 125 are bonded together in the outer periphery, and transmit to the exterior the heat received by the stationary vanes 123 from the rotary vanes 102, the friction heat generated when the exhaust gas comes into contact with the stationary vanes 123, etc.

The exhaust gas transferred to the base portion 129 is sent to the exhaust port 133 while being guided by the thread grooves 131a of the threaded spacer 131.

In the above-described example the threaded spacer 131 is arranged in the outer periphery of the rotary vane 102d, and the thread grooves 131a are formed in the inner peripheral surface of the threaded spacer 131. However, conversely to the above, the thread grooves may be formed in the outer peripheral surfaces of the rotary vane 102d, and a spacer with a cylindrical inner peripheral surface may be arranged in the periphery thereof.

Further, in order that the gas sucked in through the inlet port 101 may not enter the electrical section formed by the motor 121, the lower radial electromagnet 105, the lower radial sensor 108, the upper radial electromagnet 104, the upper radial sensor 107, etc., the periphery of the electrical section is covered with a stator column 122, and a predetermined pressure is maintained in the interior of the electrical section with a purge gas.

For this purpose, piping (not shown in the drawings) is arranged in the base portion 129, and the purge gas is introduced through the piping. The purge gas thus introduced flows through the gaps between a protective bearing 120 and the rotor shaft 113, between the rotor and stator of the motor 121, and between the stator column 122 and the rotary vanes 102 before being transmitted to the exhaust port 133.

Here, the turbo molecular pump main body 100 requires control based on individually adjusted specific parameters (e.g., the specification of the model and the properties corresponding to the model). To store these control parameters, the turbo molecular pump main body 100 has an electronic circuit portion 141.

The electronic circuit portion 141 is formed by a semiconductor memory, such as EEP-ROM, an electronic component for the access thereto, such as a semiconductor device, a substrate 143 for the mounting thereof, etc. The electronic circuit portion 141 is accommodated in the lower portion near the center of the base portion 129 constituting the lower portion of the turbo molecular pump main body 100, and is closed by a hermetic bottom cover 145.

Incidentally, for enhanced reactivity, the process gas may be introduced into the chamber in a high temperature state. When it reaches a certain temperature by being cooled at the time of evacuation, such process gas may be solidified to precipitate a product in the exhaust system. Then, when such process gas is cooled and solidified in the turbo molecular pump main body 100, it adheres to the inner wall of the turbo molecular pump main body 100 and is deposited thereon. For example, when $SiCl_4$ is used as the process gas in an Al etching apparatus, a solid product (e.g., $AlCl_3$) is precipitated when the apparatus is in a low vacuum state (760 [torr] to $10^{-2}$ [torr]) and at lower temperature (approximately 20[° C.]), and adheres to and is deposited on the inner wall of the turbo molecular pump main body 100 as can be seen from a vapor pressure curve.

When precipitate of the process gas is deposited inside the turbo molecular pump main body 100, the deposit narrows the pump flow path, which leads to a deterioration in the performance of the turbo molecular pump main body 100. For example, the above-mentioned product is likely to solidify and adhere to the portion near the exhaust port, in particular, near the rotary vanes 102 and the threaded spacer 131, where the temperature is low.

To solve this problem, there has been conventionally adopted a control system (hereinafter referred to as TMS (temperature management system)), in which a heater (not shown in the drawings), an annular water cooling tube 149, etc. are wound around the outer periphery of the base portion 129 or the like, and in which a temperature sensor (e.g., a thermistor) (not shown in the drawings) is embedded, for example, in the base portion 129, the heating by the heater and the cooling by the water cooling tube 149 being controlled based on a signal from the temperature sensor so as to maintain the base portion 129 at a fixed, high temperature (set temperature).

Here, a conventional motor control system will be described. FIG. 8 shows the construction of the conventional motor control system.

In FIG. 8, a motor control system 300 is equipped with the motor 121 on the turbo molecular pump main body 100 side.

Further, the motor 121 is equipped with an RPM detecting sensor 124 on the stator side thereof. The RPM detecting sensor 124 is arranged so as to surround the rotor shaft 113, and consists, for example, of a semiconductor Hall sensor. The RPM detecting sensor 124 detects the rotating magnetic flux density of the motor 121, thereby detecting the RPM of the rotor shaft 113.

Further, the motor 121 has on the stator side thereof three-phase motor windings 126U, 126V, and 126W. These motor windings 126U, 126V, and 126W are also arranged so as to surround the rotor shaft 113. Further, the motor windings 126U, 126V, and 126W are equipped with motor current detecting sensors 128 (only one of which is shown in the drawing), and the motor current detecting sensors 128 detect motor current Im flowing through the motor windings 126U, 126V, and 126W.

Further, the motor windings 126U, 126V, and 126W are connected to a motor driving circuit 220 on the control device 200 side.

A DC voltage is supplied to the motor driving circuit 220 from a power source 230 (In the drawing, the + side will be referred to as a positive pole 230a, and the − side will be referred to as a negative pole 230b). The motor driving circuit 220 is equipped with inverter circuits 222 (only one of which is shown in the drawing) respectively corresponding to the motor windings 126U, 126V, and 126W, and power is supplied to the motor windings 126U, 126V, and 126W through the inverter circuits 222. Each of these inverter circuits 222 is composed, for example, of two transistors 222a and 222b for one motor winding 126U.

Further, a drive signal is input to the motor driving circuit 220 from a drive control circuit 210. By this drive signal, the power supplied from the inverter circuits 222 to the motor windings 126U, 126V, and 126W is controlled. FIG. 9 is a block diagram showing the drive control circuit.

In FIG. 9, input to the drive control circuit 210 are detection signals from the RPM detecting sensor 124 and the motor current detecting sensors 128. These detection signals are input to a comparator 212.

Further, a command signal is input to the comparator 212 from a reference value setting circuit 214, and this command signal is a signal indicating, for example, a reference RPM.

The comparator 212 compares, for example, the reference RPM indicated by the command signal with the detection signal from the RPM detecting sensor 124 to effect PID compensation, and, further, compares this output signal as a current command value with the detection signals from the motor current detecting sensors 128 to effect PID compensation. Thereafter, the comparator 212 outputs this output signal to a PWM control circuit 216.

The comparator 212 is equipped with a current limiter circuit (not shown in the drawings), and this current limiter circuit performs control based on the comparison result output to the PWM control circuit 216 such that the motor current Im supplied to each of the inverter circuits 222 and the motor windings 126U, 126V, and 126W does not exceed a fixed upper limit value.

Then, based on the comparison result from the comparator 212, the PWM control circuit 216 performs pulse width control (PWM control) on the drive signal.

In this construction, the relationship between the motor current Im supplied to the inverter circuits 222 and the motor windings 126U, 126V, and 126W and the rotating speed ω of the rotor shaft 113 is as expressed by Equation 1.

$$E = L\left(\frac{\Delta \text{Im}}{\Delta t}\right) + R \cdot \text{Im} + K\omega \quad \text{Equation 1}$$

In Equation 1, L and R are the inductance component and the resistance component, respectively, of the motor windings 126U, 126V, and 126W, and K is the counter electromotive force constant of the motor windings 126U, 126V, and 126W; E is the drive voltage supplied from the inverter circuits 222.

Further, the relationship of Equation 1 is also apparent from the equivalent circuit for the inverter circuits and the motor windings shown in FIG. 10. In FIG. 10, a power source 251 corresponds to the drive voltage E supplied from the inverter circuits 222. An inductance 252 and a resistor 253 respectively correspond to the inductance component L and the resistance component R of the motor windings 126U, 126V, and 126W. Further, an AC power source 254 corresponds to the counter electromotive force Kω generated in the motor windings 126U, 126V, and 126W with the rotation of the rotor shaft 113.

The drive voltage E supplied from the inverter circuits 222 is of a fixed value, and the inductance component L, the resistance component R, and the counter electromotive force constant K of the motor windings 126U, 126V, and 126W are also values peculiar to the motor 121.

Thus, the motor current Im that can be supplied to the inverter circuits 222 and the motor windings 126U, 126V, and 126W is theoretically in conformity with Equation 1. In particular, the magnitude of the motor current Im when the rotating speed ω of the rotor shaft 113 is a rated RPM is referred to as the rated rotation current value Ir.

Here, when the rotor shaft 113 is to be rotated at the start of the turbo molecular pump, the RPM of the rotor shaft 113 and the reference RPM indicated by the command signal are compared with each other in the comparator 212, and PID compensation is effected. Further, a current command value, which is the output result thereof, and the motor current Im flowing through the motor windings 126U, 126V, and 126W are compared with each other to effect PID compensation.

Then, upon receiving this output result, the PWM control circuit 216 outputs a PWM-controlled drive signal to the inverter circuits 222 in the motor driving circuit 220, whereby power is supplied to the motor windings 126U, 126V, and 126W from the motor driving circuit 220, and an AC voltage is generated in the motor windings 126U, 126V, and 126W. Further, a torque corresponding to the motor current Im at this time is generated in the rotor shaft 113.

At the start of the turbo molecular pump, a large current value is generated as the current command value in the comparator 212; however, the comparator 212 is equipped with a current limiter circuit, with the motor current Im supplied to the inverter circuits 222 and the motor windings 126U, 126V, and 126W being controlled so as not to exceed an upper limit value set in this current limiter circuit. The upper limit value set in this current limiter circuit is the above-mentioned rated rotation current value Ir.

In this regard, at the start of the turbo molecular pump, the RPM of the rotor shaft 113 is less than the rated RPM, so that the counter electromotive force Kω is also less than the counter electromotive force Kω at rated rotation. Thus, at the start of the turbo molecular pump, according to the relationship of Equation 1, it is theoretically possible to supply a current value of not less than the rated rotation current value Ir, with the motor current being Im. However, to operate the inverter circuits 222 and the motor windings 126U, 126V, and 126W reliably and safely in the range of the RPM of the rotor 113 from zero to the rated RPM, there is set, as the upper limit value set in the current limiter circuit, the rated rotation current value Ir, which is the motor current Im when the rotor shaft 113 is at rated RPM, to allow a leeway in terms of safety.

Here, FIG. 11A shows the relationship between the starting time of the turbo molecular pump and the RPM of the rotor shaft 113, and FIG. 11B shows the relationship between the RPM of the rotor shaft 113 at this time and the motor current Im. The rated RPM of the rotor shaft 113 is approximately 37000 (rpm).

In FIG. 11A, the turbo molecular pump is started at time 0, and approximately 10 minutes thereafter, the RPM of the rotor shaft 113 attains the rated RPM. The time it takes the RPM of the rotor shaft 113 to reach the rated RPM is referred to as the starting time of the turbo molecular pump.

In FIG. 11B, from immediately after the starting of the turbo molecular pump until the RPM of the rotor shaft 113 reaches a level near the rated RPM, the motor current Im remains fixed. This is due to the fact that the motor current Im supplied to the inverter circuits 222 and the motor windings 126U, 126V, and 126W is controlled so as to be within a range not exceeding the upper limit value (the rated rotation current value Ir) set in the current limiter circuit.

Thereafter, when the RPM of the rotor shaft 113 reaches a level near the rated RPM, the motor current Im is reduced in accordance with a signal that has under gone PID compensation. During this period, the drive torque imparted to the rotor shaft 113 may be small, so that the quantity of electricity supplied from the motor driving circuit 220 to the motor windings 126U, 126V, and 126W is reduced or the supply is stopped, with the result that the motor current Im is smaller than that immediately after the starting of the turbo molecular pump.

Incidentally, in the conventional motor control system 300, at the start of the turbo molecular pump, a current value Ir at rated rotation is set as the upper limit of the motor current Im thereof, so that no torque in excess of the current value Ir at rated rotation is imparted to the rotor shaft 113, and the starting of the turbo molecular pump cannot be said to be quick enough.

The shipment of the turbo molecular pump involves a process in which the starting and stopping of the turbo molecular pump is repeated in order to inspect and evaluate the same; since the starting of the turbo molecular pump is slow, there is a fear of the production period for the turbo molecular pump becoming rather long.

Further, also when, in a case in which the turbo molecular pump is used for a movable simple vacuum chamber, the turbo molecular pump is re-started, due to its slow starting, there is a fear of the vacuum degree in the chamber being reduced, resulting in a reduction in the service life of the material and measurement filament.

Further, from now on, a flat panel display will tend to increase in size, and the turbo molecular pump will also tend to increase in size in order to improve the vacuum performance of the manufacturing apparatus for such a large flat panel display. Thus, in a turbo molecular pump equipped with the conventional motor control system 300, there is a fear of its starting becoming still slower.

SUMMARY OF THE INVENTION

The present invention is made in view of the above problems in the prior art, and an object thereof is to provide a motor control system capable of shortening the starting time of a turbo molecular pump and a vacuum pump equipped with the motor control system.

Therefore, the present invention relates to a motor control system including: a rotary member; a motor for imparting a torque to the rotary member; a motor driving circuit for supplying power to the motor; and drive control means for controlling a motor current supplied to the motor, characterized in that the motor current is controlled by using as a set value a value of a motor current Im calculated by Equation 1.

The motor current Im calculated by Equation 1 is a theoretical motor current value obtained from the motor and an equivalent circuit for the motor driving circuit. The motor current supplied to the motor is controlled by using this calculated value of the motor current Im as a set value. To control the motor current within the safety range for the motor and the motor driving circuit, it is desirable to determine a leeway in Equation 1. This leeway is obtained in advance by, for example, experiment or calculation.

This makes it possible to increase the motor current within the safety range for the motor and the motor driving circuit, thus making it possible to shorten the motor starting time.

The set value of the motor current is an upper limit value or a command value.

Further, the present invention relates to a motor control system including: a rotary member; a motor for imparting a torque to the rotary member; a motor driving circuit for supplying power to the motor; temperature detecting means for detecting one or both of a temperature of the motor and a temperature of the motor driving circuit; a characteristic curve defining one or both of a relationship between the temperature of the motor and a current value at continuous rating of the motor and a relationship between the temperature of the motor driving circuit and a current value at continuous rating of the motor driving circuit; set value setting means for, in accordance with the characteristic curve and based on the temperature detected by the temperature detecting means, setting the current value at continuous rating at the temperature as the set value of the motor current supplied to the motor; and drive control means for controlling the motor current such that the motor current does not exceed the set value set by the set value setting means.

In the drive control means, the motor current is controlled so as not to exceed the set value set by the set value setting means. At this time, in the set value setting means, in accordance with the characteristic curve and based on the temperature detected by the temperature detecting means, the current value at continuous rating of the motor and the motor driving circuit at this temperature is set as the set value.

Accordingly, the motor current is controlled within the range of the current value at continuous rating of the motor and the motor driving circuit. Thus, it is possible to prevent excessive supply of motor current to the motor and the motor driving circuit.

This makes it possible to increase the motor current while preventing breakdown of the motor and the motor driving circuit, thereby making it possible to shorten the motor starting time.

Further, the present invention relates to a motor control system including: a rotary member; a motor for imparting a torque to the rotary member; a motor driving circuit for supplying power to the motor; temperature detecting means for detecting one or both of a temperature of the motor and a temperature of the motor driving circuit; a characteristic curve defining one or both of a relationship between the temperature of the motor and a current value at short-term rating of the motor and a relationship between the temperature of the motor driving circuit and a current value at short-term rating of the motor driving-circuit; set value setting means for, in accordance with the characteristic curve and based on the temperature detected by the temperature detecting means, setting the current value at short-term rating at the temperature as the set value of the motor current supplied to the motor; and drive control means for controlling the motor current such that the motor current does not exceed the set value set by the set value setting means.

The characteristic curve defines the relationship between the temperature of the motor and the motor driving circuit and the current value at short-term rating of these components.

Further, in the set value setting means, in accordance with the characteristic curve and based on the temperature detected by the temperature detecting means, the current value at short-term rating of the motor and the motor driving circuit at this temperature is set as the set value. Thus, it is possible to control the motor current within a range not less than the current value at continuous rating.

Thus, it is possible to further shorten the motor starting time. Further, since the motor current is controlled so as not to exceed the permissible value at short-term rating of the motor and the motor driving circuit, it is possible to prevent their breakdown in a critical state.

Further, the present invention provides a vacuum pump equipped with a motor control system, characterized in that the vacuum pump is installed in target equipment and sucks a predetermined gas from the target equipment.

The motor control system of the present invention is mounted in a vacuum pump.

Accordingly, the process before shipment, which requires the vacuum pump to be started and stopped repeatedly, can be conducted quickly, thereby making it possible to shorten the production period for the vacuum pump.

Further, also when the vacuum pump is used in a movable simple vacuum chamber, the starting time for restarting the vacuum pump can be shortened, which makes it possible to regain the requisite vacuum degree inside the chamber promptly. Thus, it possible to increase the service life of the material and measurement filament in the chamber.

Further, even when the vacuum pump is increased in size to be in conformity with manufacturing apparatus for a large flat panel display, it is possible to shorten its starting time. Thus, it is possible to shorten the start-up time of the manufacturing apparatus for the large flat panel display. Further, when applied to a vacuum pump of conventional size, the present invention helps to shorten the start-up time of a semiconductor manufacturing apparatus, an electron microscope, etc.

DETAILED DESCRIPTION OF THE PREFERRED EMBODIMENTS

Embodiments of the present invention will now be described.

Figure 1:
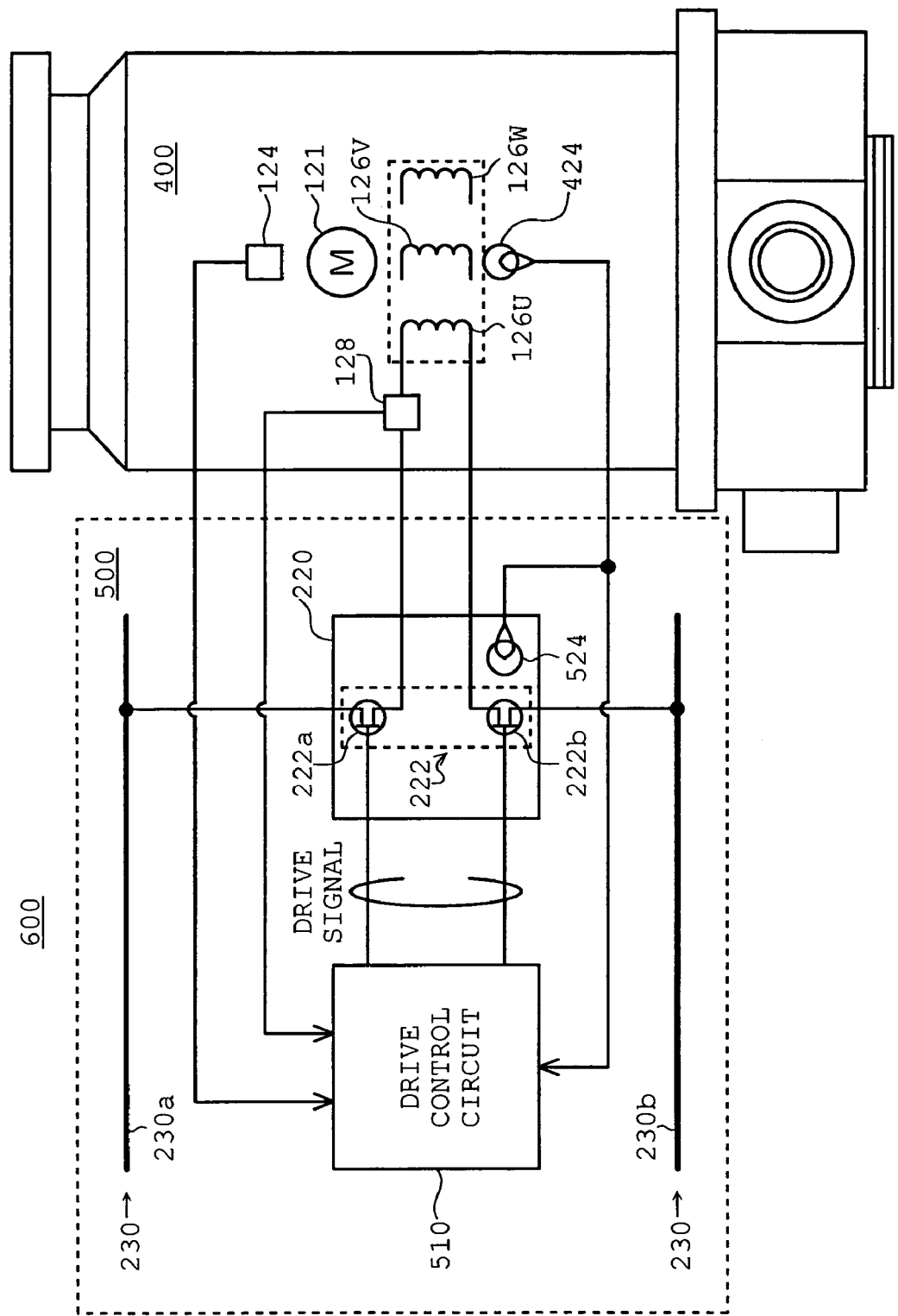
FIG. 1 is a diagram showing the configuration of a motor control system according to an embodiment of the present invention.
Figure 8:
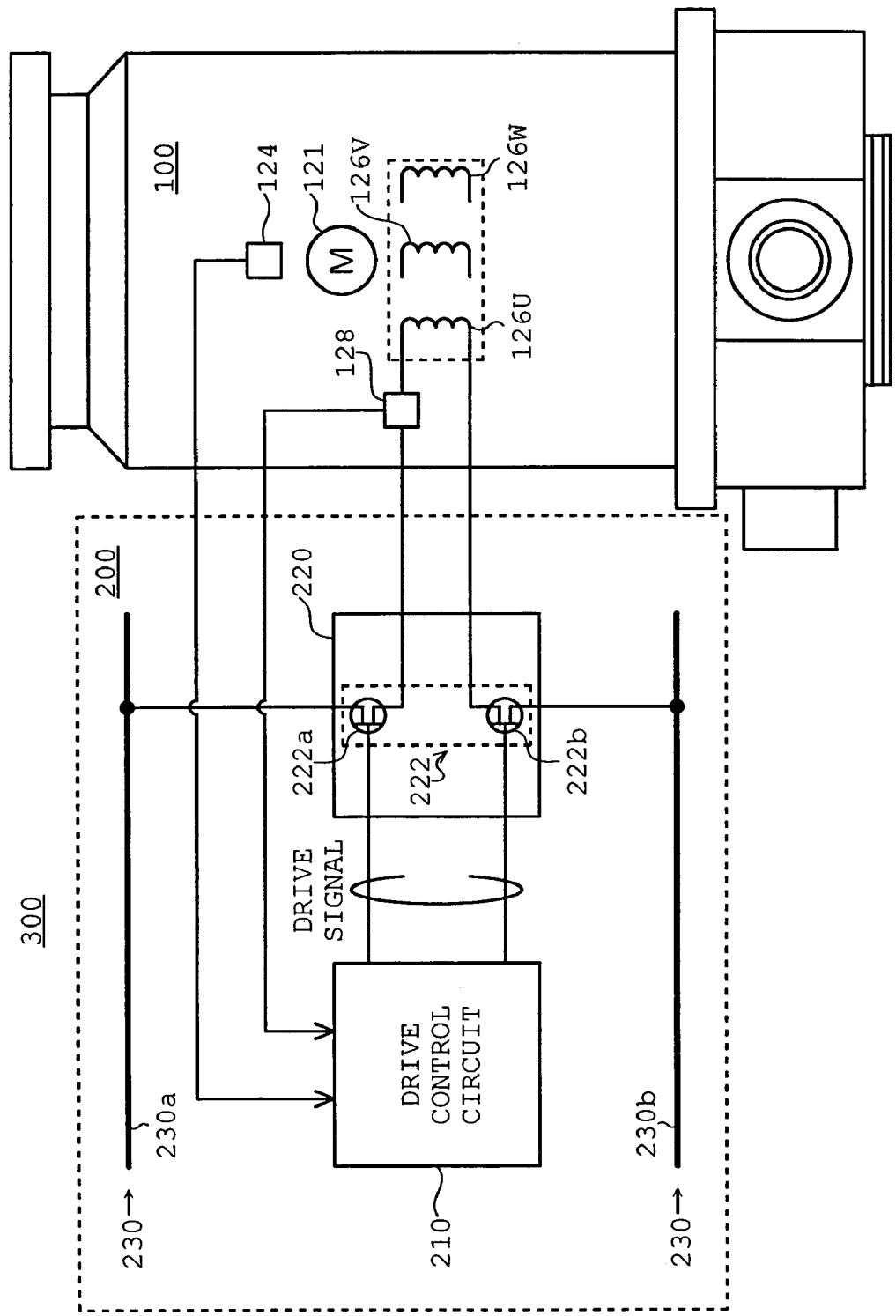
FIG. 8 is a diagram showing the construction of a conventional motor control system.

FIG. 1 shows the configuration of a motor control system according to an embodiment of the present invention. The components that are the same as those of FIG. 8 are indicated by the same symbols, and a description thereof will be omitted.

In FIG. 1, a motor control system 600 includes a turbo molecular pump main body 400, in which motor windings 126U, 126V, and 126W are equipped with a motor temperature sensor 424. The motor temperature sensor 424 consists, for example, of a thermistor, which is adapted to detect the temperature of the motor windings 126U, 126V, and 126W.

Further, the motor control system includes a control device 500, in which also the inverter circuits 222 are equipped with an inverter temperature sensor 524. The inverter temperature sensor 524 also consists, for example, of a thermistor, which is adapted to detect the temperature of transistors 222a, 222b, etc. constituting each inverter circuit 222.

Detection signals from the motor temperature sensor 424 and the inverter temperature sensor 524 are input to a drive control circuit 510 described below.

Figure 2:
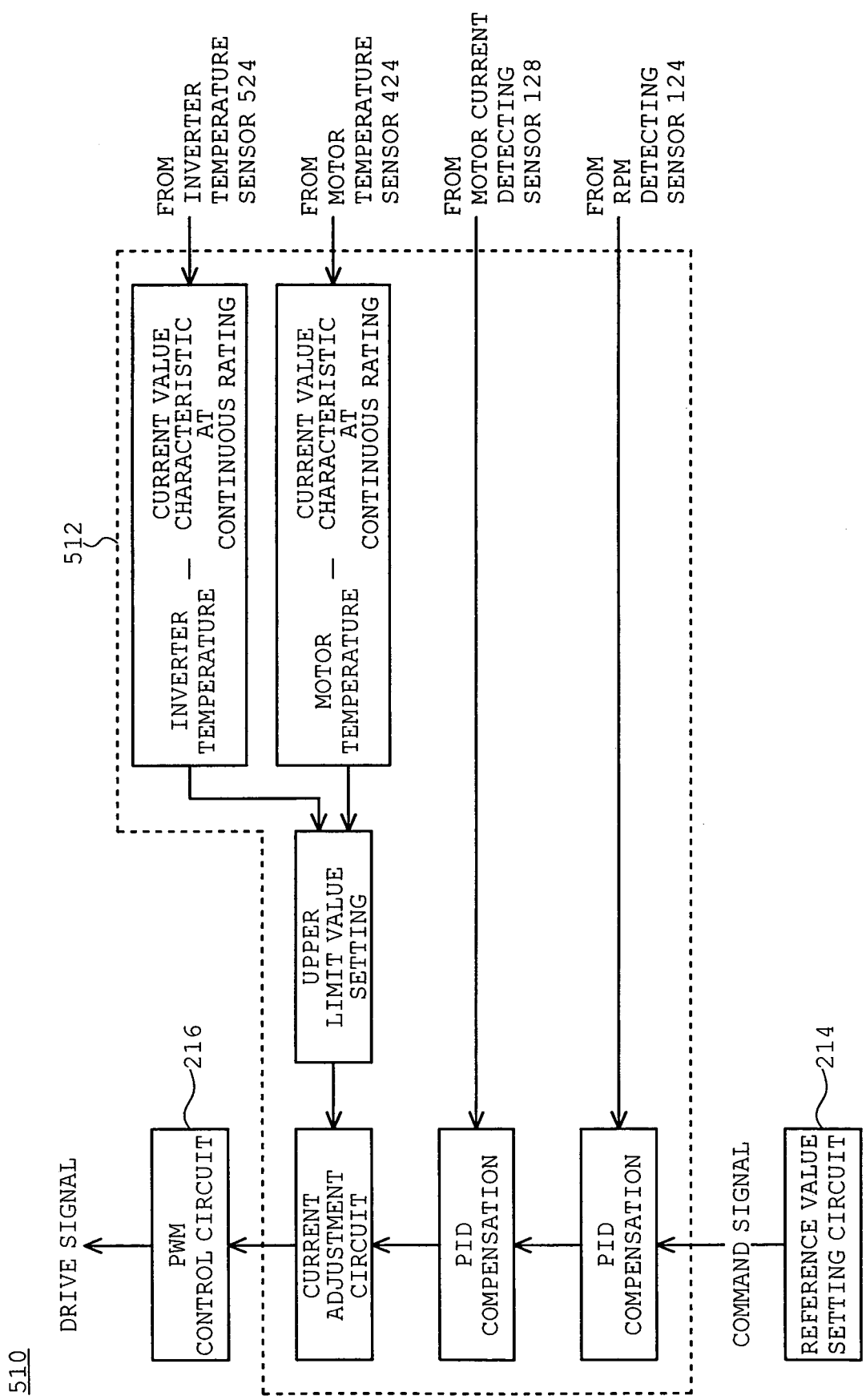
FIG. 2 is a block diagram (No. 1) showing a drive control circuit.
Figure 9:
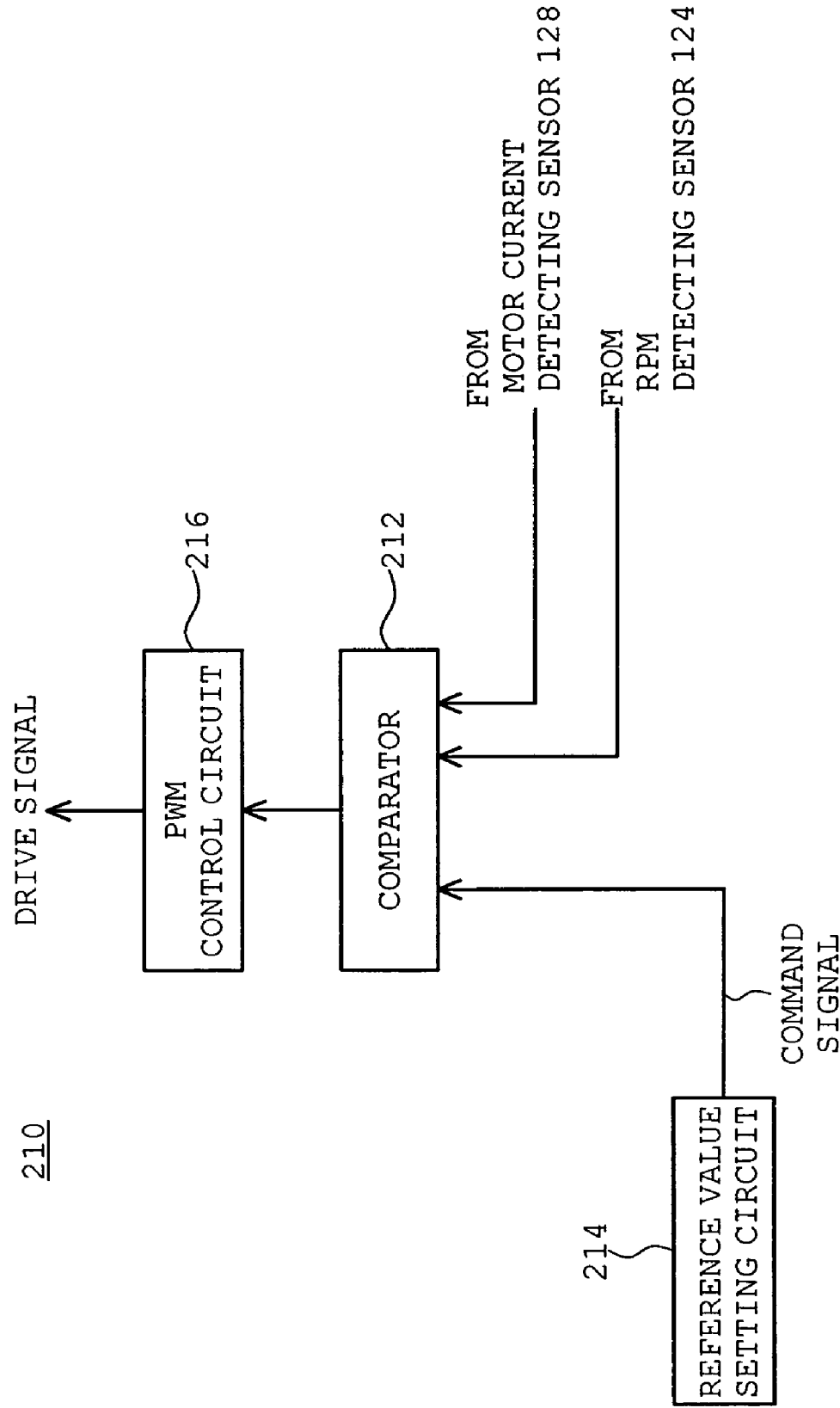
FIG. 9 is a block diagram showing a drive control circuit.
Figure 10:
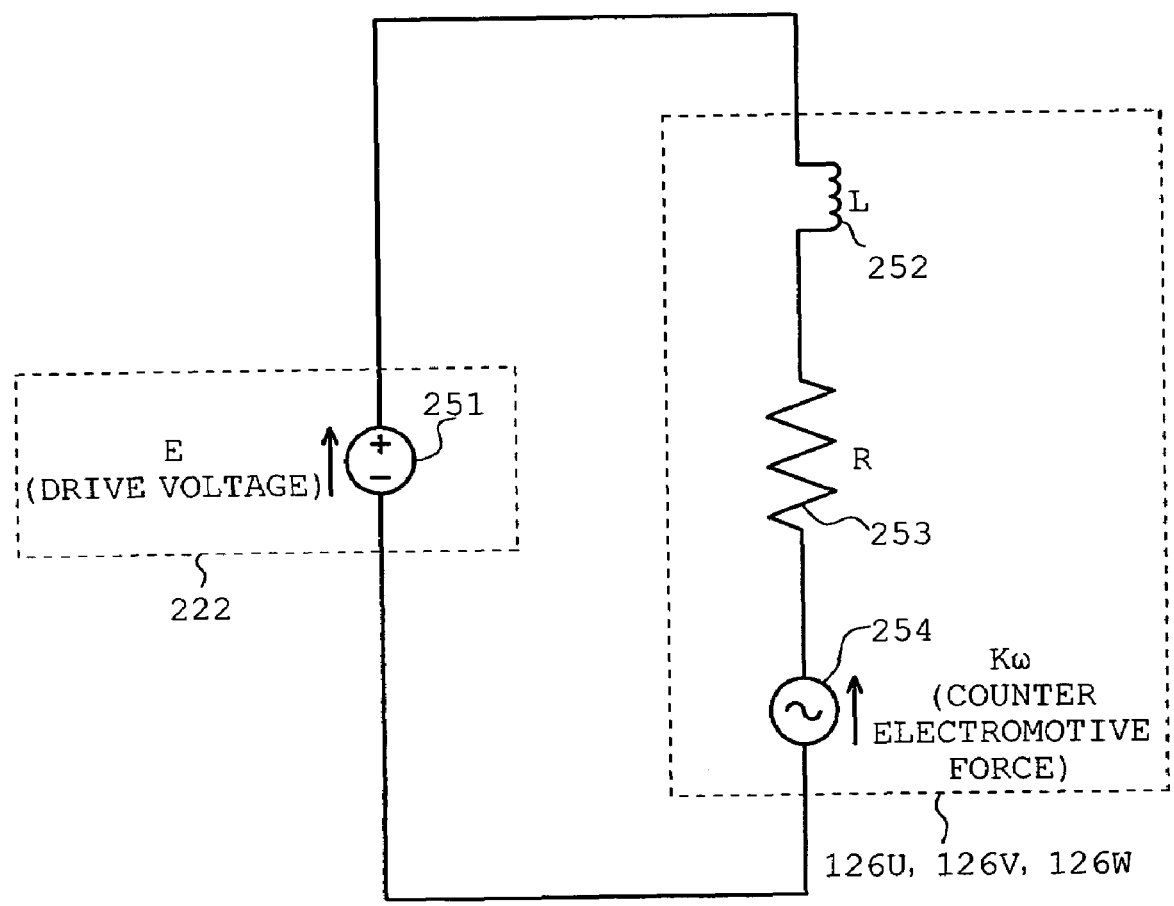
FIG. 10 is a diagram showing an equivalent circuit for an inverter circuit and a motor winding.

FIG. 2 is a block diagram showing this drive control circuit. The components that are the same as those of FIG. 9 are indicated by the same symbols, and a description thereof will be omitted.

In FIG. 2, the drive control circuit 510 includes a comparator 512, to which there are input the detection signals from the motor temperature sensor 424 and the inverter temperature sensor 524. Further, as in the case of the conventional comparator 212, input to the comparator 512 are a command signal from the reference value setting circuit 214 and detection signals from the RPM detecting sensor 124 and the motor current detecting sensor 128.

Further, like the conventional comparator 212, the comparator 512 compares, for example, a reference RPM indicated by the command signal with the detection signal from the RPM detecting sensor 124 to effect PID compensation, and then, further, compares this output signal as the current command value with the detection signal from the motor current detecting sensor 128 to effect PID compensation.

Further, this comparator 512 is equipped, instead of the current limiter circuit provided in the conventional comparator 212, with a current adjustment circuit. In this current adjustment circuit, the upper limit value of the motor current Im is set so as to be variable in accordance with a characteristic curve shown below.

Here, the comparator 512 is equipped with a characteristic curve defining the relationship between the temperatures of the motor windings 126U, 126V, and 126W and the inverter circuits 222 and the current value at continuous rating of the motor windings 126U, 126V, and 126W and the inverter circuits 222 at that temperature.

This characteristic curve is obtained in advance by table making through experiment or by calculation through modeling of the drive control circuit 510, the motor 121, etc. Further, this characteristic curve may be set so as to be fixed inside the control device 500, etc. or so as to allow rewriting from the outside.

In accordance with this characteristic curve and based on the temperatures detected by the motor temperature sensor 424 and the inverter temperature sensor 524, the comparator 512 sets, in the current adjustment circuit, the lower one of the current values at continuous rating of the motor windings 126U, 126V, and 126W and the inverter circuits 222 at that temperature as the upper limit value of the motor current Im. Thus, the upper limit value set in the current adjustment circuit is a current value at continuous rating satisfying both the motor windings 126U, 126V, and 126W and the inverter circuits 222.

In order to prevent errors, etc. due to a delay in terms of time between the comparing operation in the comparator 512 and the temperatures detected by the motor temperature sensor 424 and the inverter temperature sensor 524, the comparator 512 may be equipped with a feed forward control circuit (not shown in the drawings).

In this construction, the motor current Im at the start of the turbo molecular pump of the present invention is larger than the motor current Im in the prior art. The reason for this will be explained below.

In the conventional motor control system 300, the current value Ir at rated rotation is constantly set as the upper limit value of the motor current Im set in the current limiter circuit.

In contrast, in the motor control system 600 of the present invention, the current value Ir at rated rotation is not used as the upper limit value of the motor current Im. According to the relationship of Equation 1 as described above, at the start of the turbo molecular pump, it is theoretically possible to provide a motor current Im not less than the rated rotation current value Ir.

Thus, in the motor control system 600 of the present invention, it is possible for the motor current Im to be larger than in the prior art.

However, in thus increasing the motor current Im, it is necessary to prevent breakdown of the motor windings 126U, 126V, and 126W and the inverter circuits 222 due to excessive supply of the motor current Im.

In view of this, in the motor control system 600 of the present invention, there are provided the motor temperature sensor 424 and the inverter temperature sensor 524, which respectively detect the temperatures of the inverter circuits 222 and the motor windings 126U, 126V, and 126W. Then, in the comparator 512, the upper limit value of the motor current Im is set based on the temperatures of the inverter circuits 222 and the motor windings 126U, 126V, and 126W.

Thus, in the present invention, the motor current Im is controlled in accordance with the characteristic curve and within the range of the current value at continuous rating satisfying both the motor windings 126U, 126V, and 126W and the inverter circuits 222. Thus, it is possible to prevent excessive supply of the motor current Im.

Figure 3A:
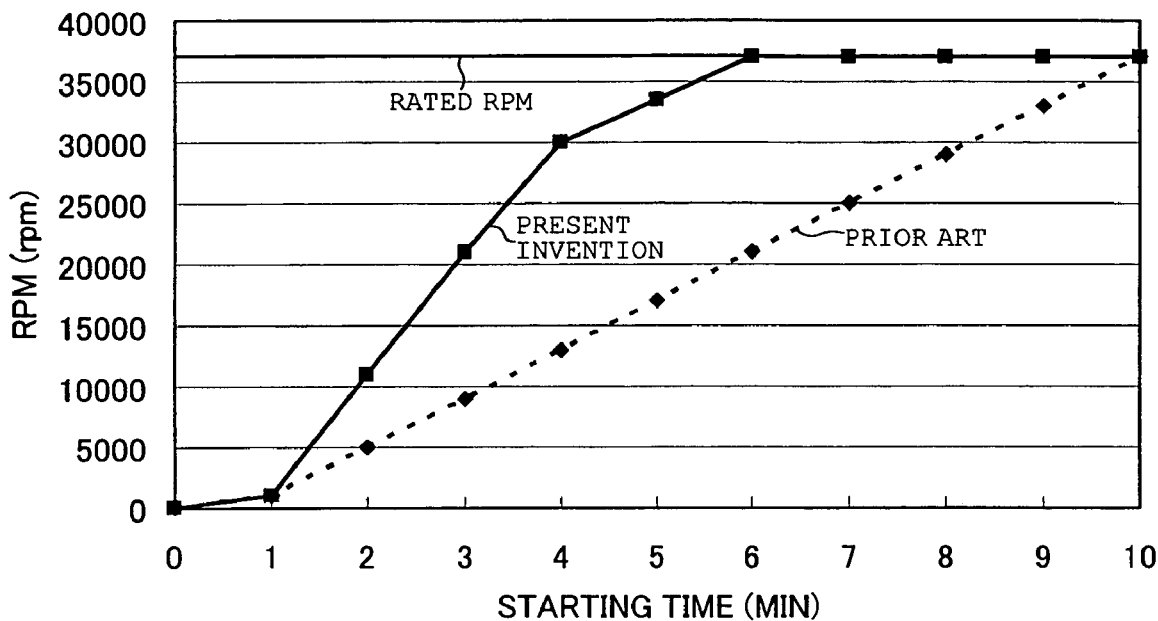
FIGS. 3A and 3B are graphs showing the relationship between turbo molecular pump starting time, rotor shaft RPM, and motor current.
Figure 3B:
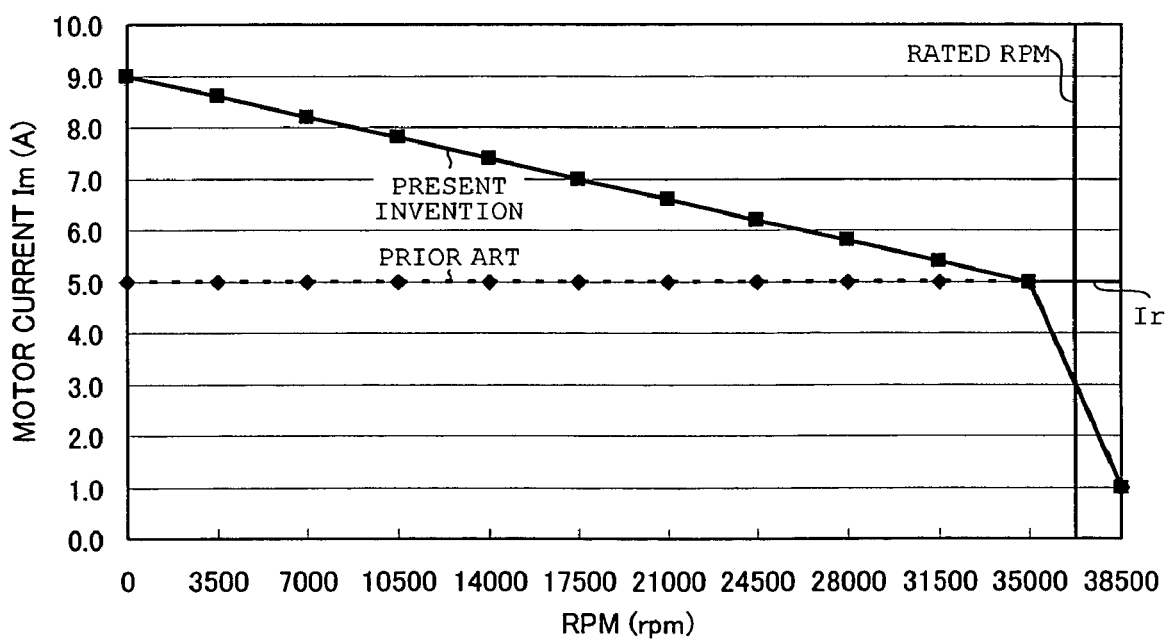
Figure 11A:
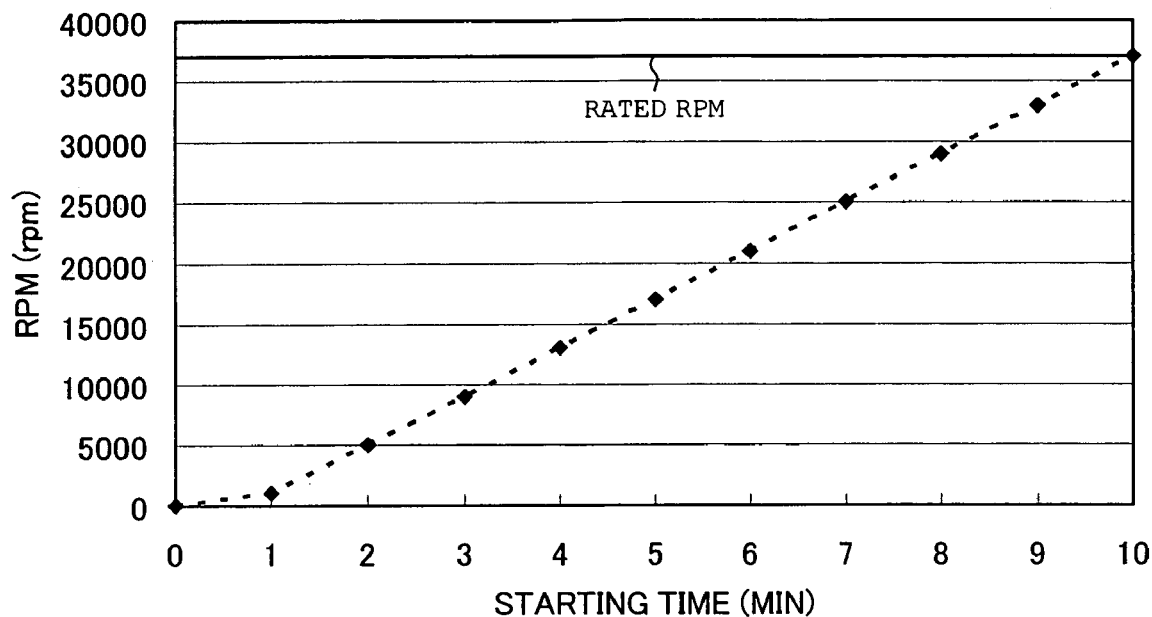
FIGS. 11A and 11B are graphs showing the relationship between turbo molecular pump starting time, rotor shaft RPM, and motor current.
Figure 11B:
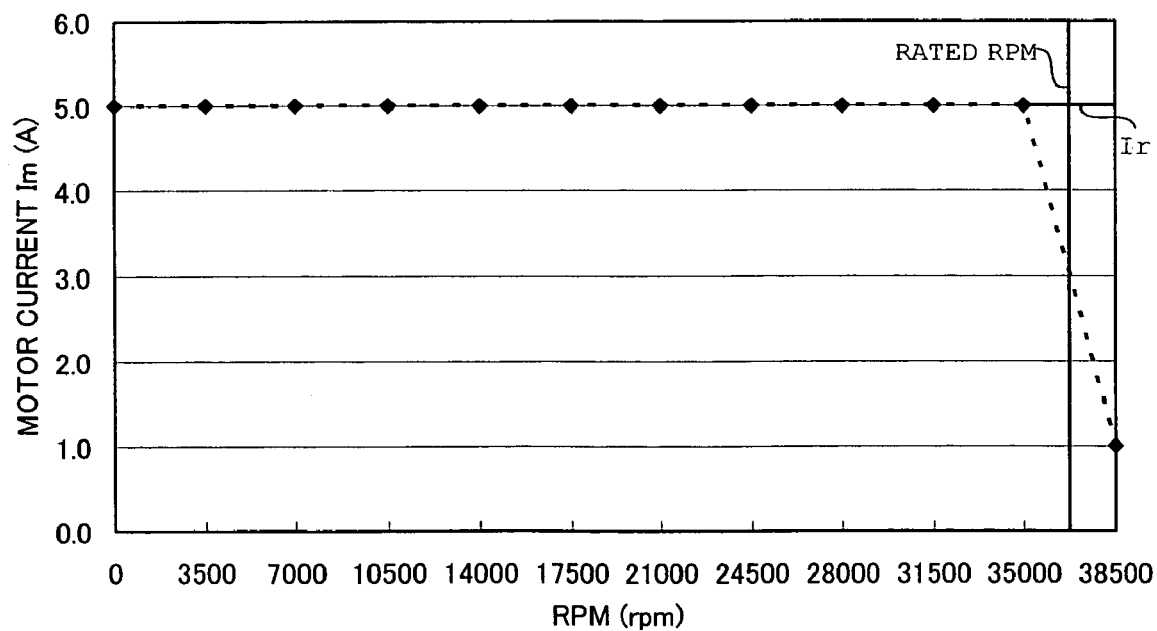

Here, based on the above operation, FIG. 3A shows the relationship between the starting time of the turbo molecular pump and the RPM of the rotor shaft 113, and FIG. 3B shows the relationship between the RPM of the rotor shaft 113 at this time and the motor current Im. The components that are the same as those of FIGS. 11A and 11B are indicated by the same symbols, and a description thereof will be omitted.

In FIG. 3B, the motor current Im at the start of the turbo molecular pump is larger than the motor current Im in the prior art. This is due to the fact that the current value Ir at rated rotation in the prior art is not used as the upper limit value of the motor current Im and that, theoretically, it is possible to supply a motor current Im according to the relationship of Equation 1.

On the other hand, the motor current Im immediately after the start of the turbo molecular pump (RPM: 0) is approximately 9 A, which is smaller than the value of the motor current Im calculated by Equation 1. This is because the upper limit value of the motor current Im set in the current adjustment circuit in the comparator 512 is the current value at continuous rating, which satisfies both the motor windings 126U, 126V, and 126W and the inverter circuits 222.

As a result, a motor current Im larger than the motor current Im in the prior art is supplied, within the range of the current value at continuous rating, to the motor windings 126U, 126V, and 126W, so that the drive torque imparted to the rotor shaft 113 increases, and, as shown in FIG. 3A, it is possible to shorten the starting time of the turbo molecular pump.

Accordingly, the process before shipment, which requires the turbo molecular pump to be started and stopped repeatedly, can be conducted quickly, thereby making it possible to shorten the production period for the turbo molecular pump.

Further, also when the turbo molecular pump is used in a movable simple vacuum chamber, the starting time for restarting the turbo molecular pump can be shortened, which makes it possible to regain the requisite vacuum degree inside the chamber promptly. Thus, it possible to increase the service life of the material and measurement filament in the chamber.

Further, even when the turbo molecular pump is increased in size to be in conformity with manufacturing apparatus for a large flat panel display, it is possible to shorten its starting time. Thus, it is possible to shorten the start-up time of the manufacturing apparatus for the large flat panel display. Further, when applied to a turbo molecular pump of conventional size, the present invention helps to shorten the start-up time of a semiconductor manufacturing apparatus, an electron microscope, etc.

In addition, in increasing the motor current Im to shorten the starting time of the turbo molecular pump, the motor current Im is controlled in the current adjustment circuit of the comparator 512 so as to be within the range of the current value at continuous rating as indicated by the characteristic curve, whereby making it possible to prevent breakdown of these components.

While in the above description of the present invention the comparator 512 sets, as the upper limit value of the motor current Im, the current value at continuous rating satisfying both of the components at the temperature in accordance with the characteristic curve and based on the temperatures detected by the motor temperature sensor 424 and the inverter temperature sensor 524, this should not be construed restrictively.

Figure 4:
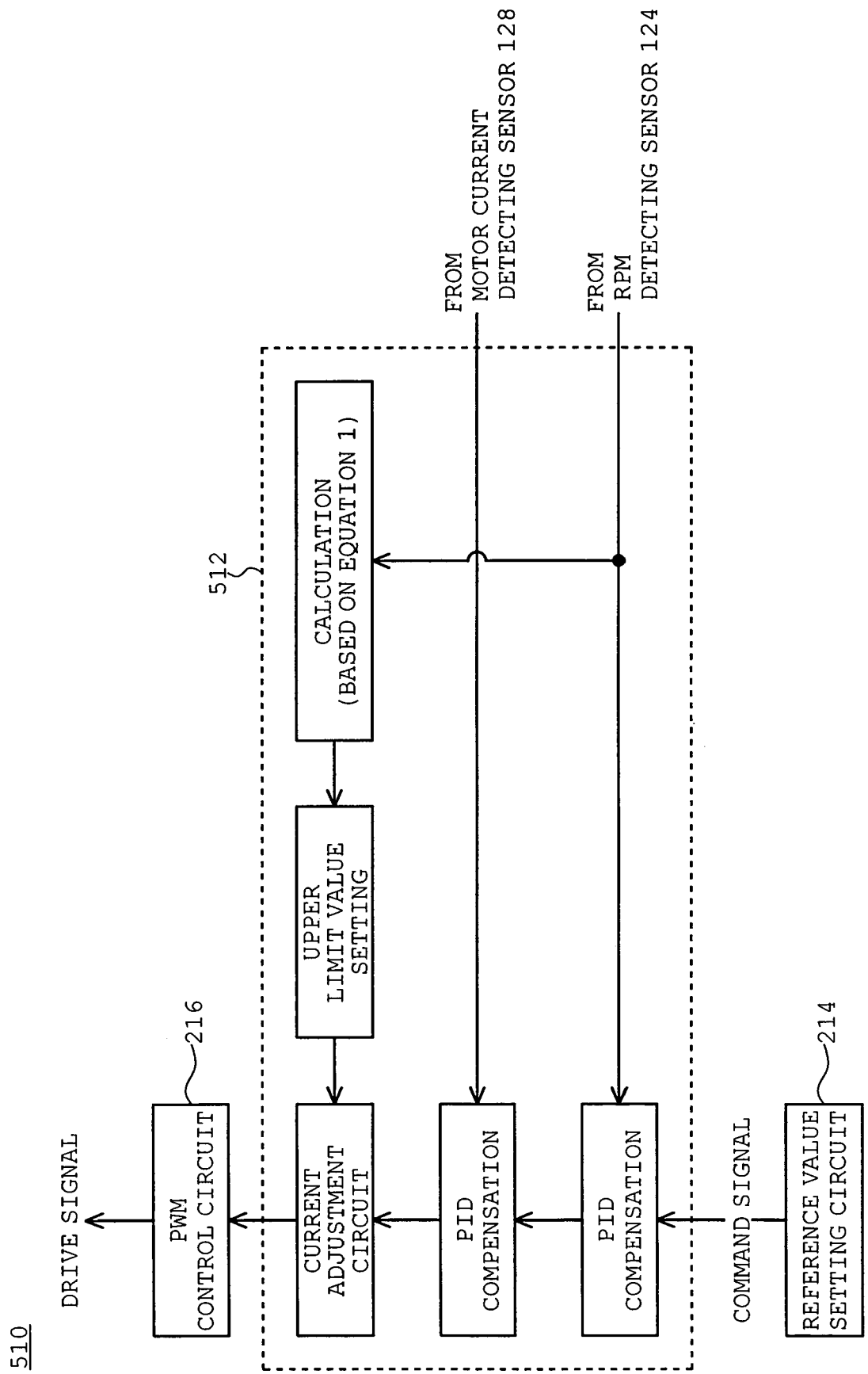
FIG. 4 is a block diagram (No. 2) showing a drive control circuit.

For example, as shown in FIG. 4, instead of detecting the temperatures of the motor windings 126U, 126V, and 126W and of the inverter circuits 222, it is also possible to set the upper limit value of the motor current Im through calculation based on Equation 1 mentioned above.

Further, in this case, in order to prevent breakdown of the motor windings 126U, 126V, and 126W and the inverter circuits 222, a safety value of the motor current Im satisfying both of the components may be obtained previously by experiment or calculation. Then, in the comparator 512, a function indicating a leeway based on this safety value is added to Equation 1, and the motor current Im is calculated by this equation. As a result, this calculated motor current Im is adopted as the upper limit value of the motor current Im set in the current adjustment circuit.

Due to this arrangement, there is no need to provide the motor temperature sensor 424, the inverter temperature sensor 524, etc., so that it is possible to achieve a reduction in parts cost. Further, since the motor current Im can be controlled within the range of the safety value of the motor current Im obtained through experiment, it is possible to shorten the starting time of the turbo molecular pump within a range of reliability reflecting the various factors regarding the motor windings 126U, 126V, and 126W and the inverter circuits 222.

Further, while in the above description of the present invention the motor current Im is controlled within the range of the current value at continuous rating satisfying both of the components, the motor windings 126U, 126V, and 126W and the inverter circuits 222, this should not be construed restrictively.

If the current value at continuous rating of one of the two categories of components: the motor windings 126U, 126V, and 126W and the inverter circuits 222, is obviously larger than the current, value at continuous rating of the other, it is also possible to control the upper limit value of the motor current Im within the range of the current value at continuous rating solely with respect to the components of the lower current value.

Further, while in the above description of the present invention the motor current Im is controlled within the range of the current value at continuous rating, this should not be construed restrictively.

Figure 5:
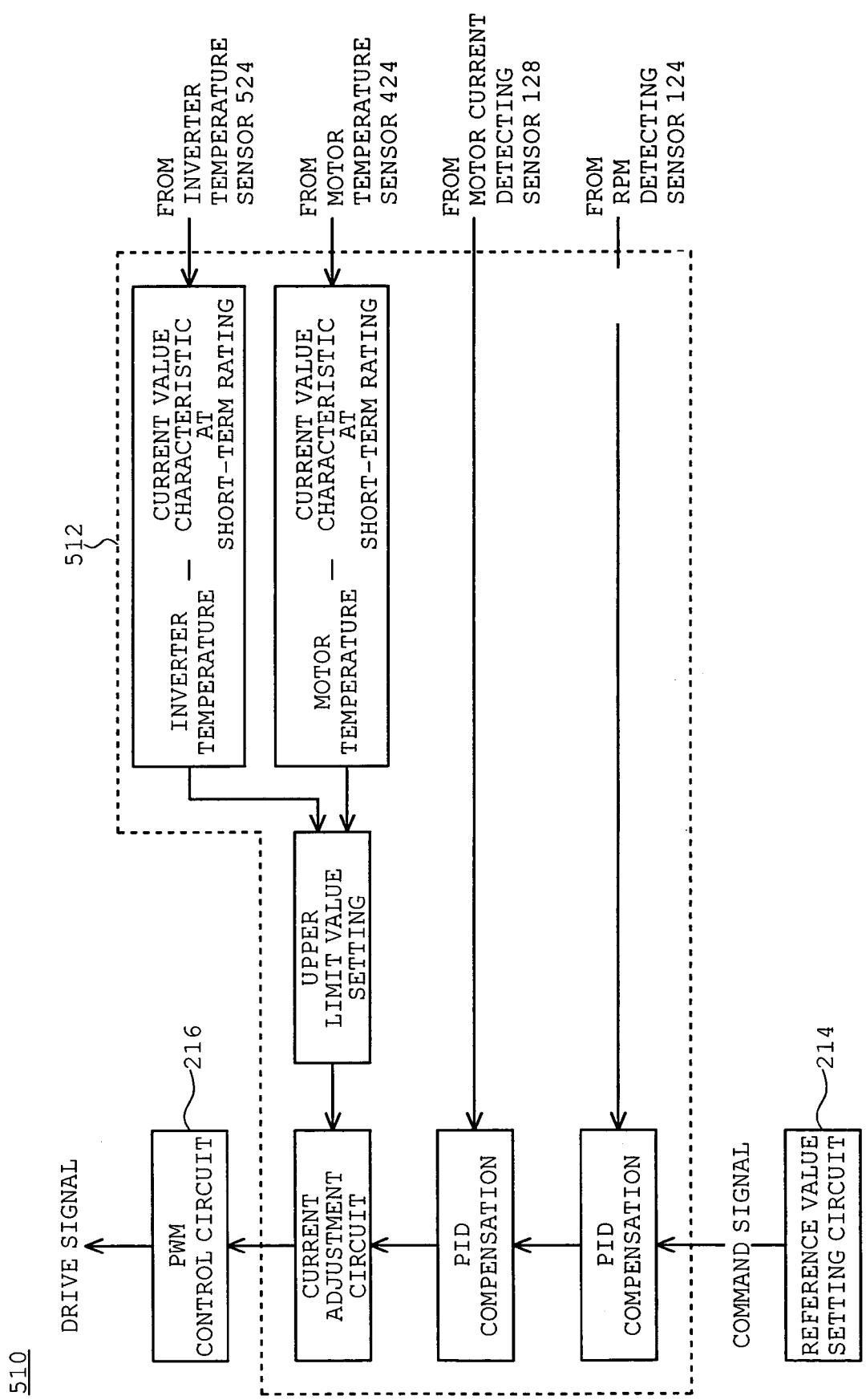
FIG. 5 is a block diagram (No. 3) showing a drive control circuit.

For example, as shown in FIG. 5, if for a short period, the motor current Im may be controlled within a range beyond the current value at continuous rating, that is, within the range of the current value at short-term rating.

In this case, the comparator 512 is equipped, instead of the characteristic curve showing the relationship of the current value at continuous rating as mentioned above, with a characteristic curve indicating the relationship of the current values at short-term rating of the motor windings 126U, 126V, and 126W and the inverter circuits 222 with respect to the respective temperatures thereof.

In the comparator 512, a permissible time is first selected, and a characteristic curve corresponding to this permissible time is selected. As a result, in accordance with the characteristic curve thus selected, the comparator 512 sets the upper limit value of the motor current Im based on the temperatures detected by the motor temperature sensor 424 and the inverter temperature sensor 524.

Figure 6:
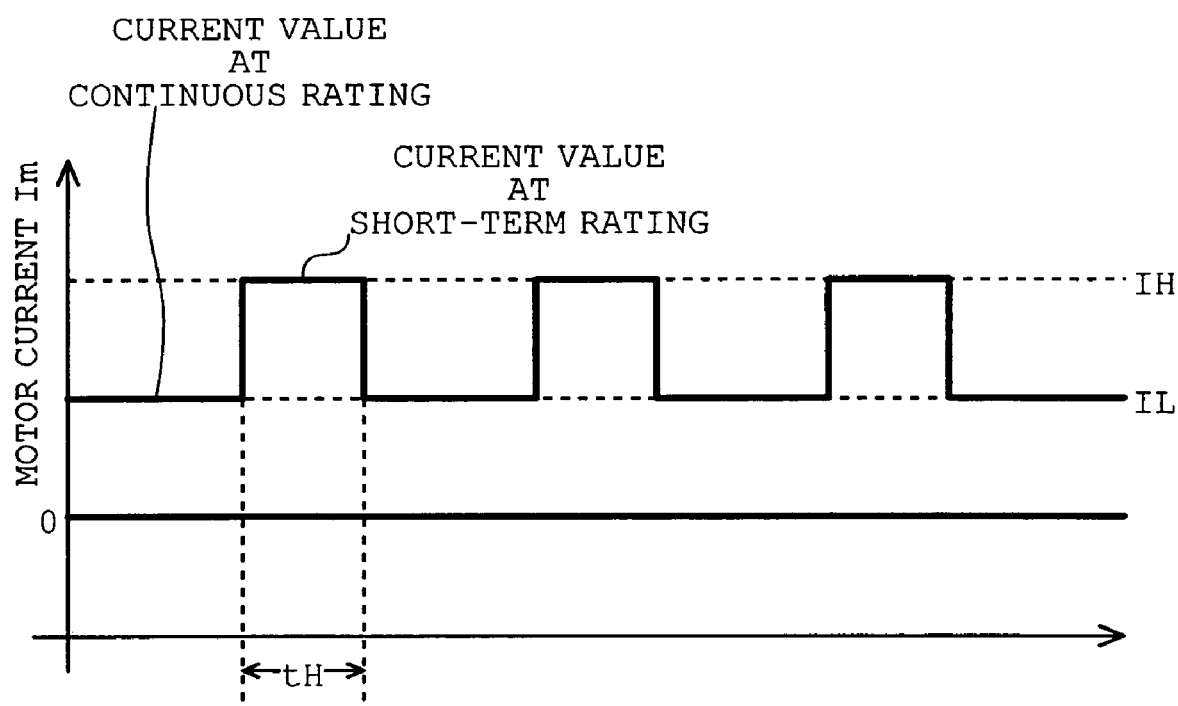
FIG. 6 is a time chart showing an example of how motor current is controlled.
Figure 7:
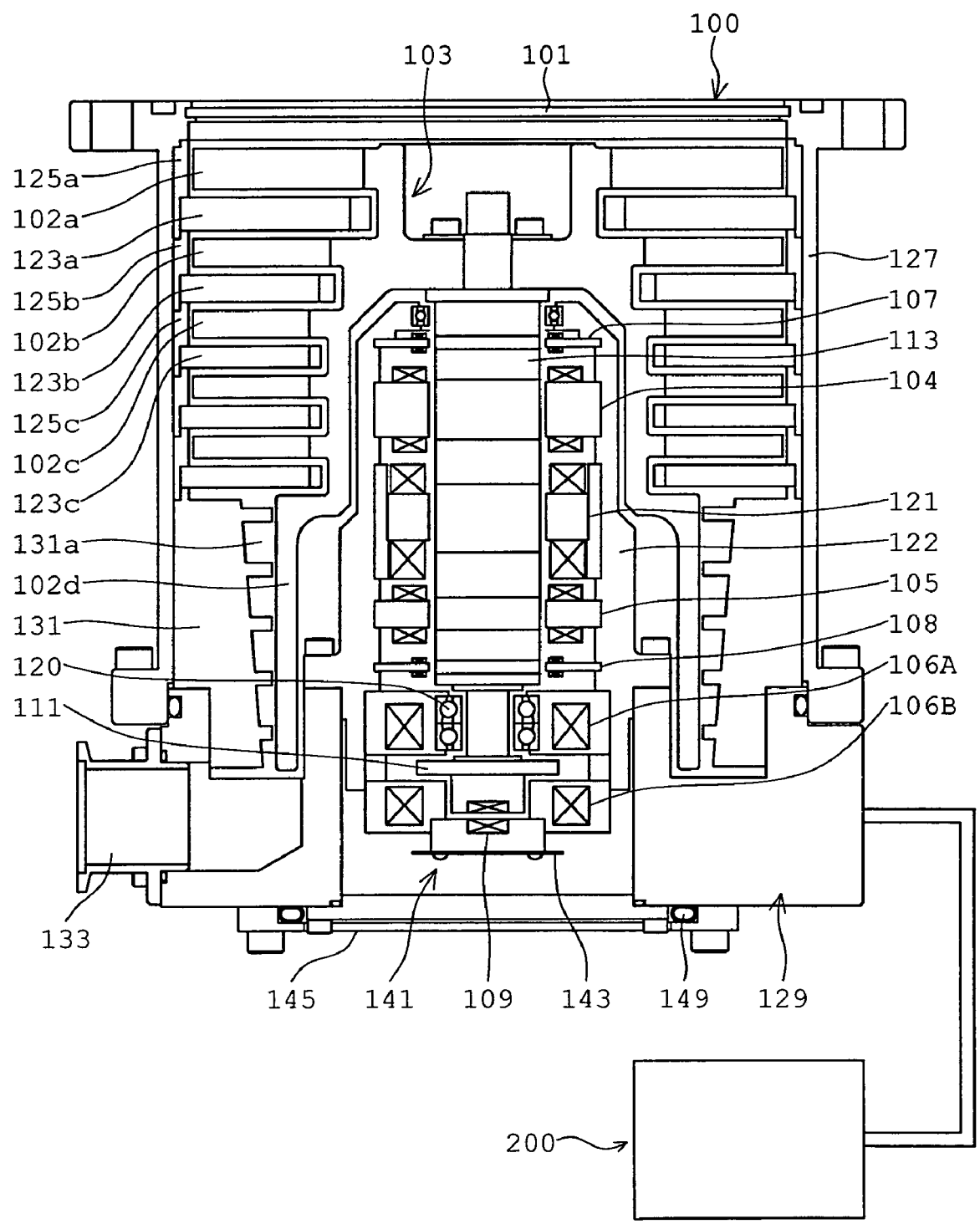
FIG. 7 is a diagram showing the construction of a conventional turbo molecular pump.

FIG. 6 is a time chart showing an example of how the motor current Im is controlled in this case.

In FIG. 6, two current values IL and IH are supplied to the motor windings 126U, 126V, and 126W and the inverter circuits 222 as the motor current Im.

Here, the current value IL constitutes the current value at continuous rating. The current value IH constitutes the current value at short-term rating of the motor windings 126U, 126V, and 126W and the inverter circuits 222 at the temperatures at that time, in accordance with the characteristic curve corresponding to the permissible time tH determined by the comparator 512.

As shown in FIG. 6, by alternately supplying the current value IL and the current value IH to the motor windings 126U, 126V, and 126W and the inverter circuits 222 as the motor current Im, it is possible to increase the average value of the motor current Im.

By performing such control on the motor current Im at the start of the turbo molecular pump, it is possible to further shorten the starting time thereof. Further, in supplying the current value IH, the current value IH is controlled based on the characteristic curve at short-term rating with respect to the motor windings 126U, 126V, and 126W and the inverter circuits 222, so that it is possible to prevent breakdown of these components in a critical state.

What is claimed is:

1. A motor control system comprising:
   a rotary member;
   a motor for imparting a torque to the rotary member;
   a motor driving circuit for supplying power to the motor; and
   drive control means for controlling a motor current supplied to the motor;
   wherein an upper limit value of the motor current supplied to the motor is set so as to be variable; and
   wherein at the start of the motor, the drive control means controls the motor current by using the upper limit value as a set value.

2. A motor control system according to claim 1; wherein the drive control means controls the motor current so as not to exceed the set value.

3. A motor control system according to claim 2; wherein a safety value is included in the set value.

4. In combination: a vacuum pump for use in an apparatus and having a pump main body for sucking and evacuating gas into and from a vacuum chamber of the apparatus; and a motor control system as claimed in claim 1 for controlling operation of the pump main body.

5. A motor control system according to claim 1; wherein the upper limit value of the motor current is a previously obtained upper limit value.

6. A motor control system comprising:
   a rotary member;
   a motor for imparting a torque to the rotary member;
   a motor driving circuit for supplying power to the motor; and
   drive control means for controlling a motor current supplied to the motor;
   wherein a set value of the motor current is set so as to be variable; and
   wherein the drive control means controls the motor current at the start of the motor by using the set value as a set value.

* * * * *